United States Patent
Stancliffe et al.

(10) Patent No.: US 7,407,543 B2
(45) Date of Patent: Aug. 5, 2008

(54) BINDER COMPOSITION COMPRISING CONDENSED TANNIN AND FURFURYL ALCOHOL AND ITS USES

(75) Inventors: Mark R. Stancliffe, Bromyard (GB); Jorg Kroker, Powell, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 11/681,037

(22) Filed: Mar. 1, 2007

(65) Prior Publication Data

US 2007/0149644 A1 Jun. 28, 2007

Related U.S. Application Data

(62) Division of application No. 10/966,342, filed on Oct. 15, 2004, now Pat. No. 7,211,137.

(51) Int. Cl.
*B28B 7/34* (2006.01)
(52) U.S. Cl. ............... 106/38.2; 106/287.2; 523/144
(58) Field of Classification Search ............... 106/38.2, 106/287.2; 523/144
See application file for complete search history.

(56) References Cited

U.S. PATENT DOCUMENTS

| 3,513,001 A | 5/1970 | Worthington et al. ...... 106/38.5 |
| 4,357,194 A | 11/1982 | Stofko ...................... 156/308.6 |
| 4,769,434 A | 9/1988 | Van der Klashorst et al. .... 527/403 |
| 5,238,680 A | 8/1993 | Connolly ................. 424/195.1 |
| 6,589,460 B1 | 7/2003 | Shen ......................... 264/109 |
| 2004/0115455 A1* | 6/2004 | Quist et al. ................. 428/500 |
| 2005/0158414 A1 | 7/2005 | Krasutsky et al. ........... 424/771 |

FOREIGN PATENT DOCUMENTS

| EP | 0444163 B1 | 1/1998 |
| GB | 923771 | 4/1963 |
| WO | 98/37148 | 8/1998 |

OTHER PUBLICATIONS

"Industrial Hardboard and Other Panels Binder from Tannin/Furfuryl Alcohol in Absence of Formaldehyde", A. Trosa et al., *Holz als Roh—und Werkstoff* 56, 213-214 (1988).
"Condensed Tannins: Reactions of Model Compounds with /Furfuryl Alcohol and Furfuraldehyde", Foo et al, *Journal of Wood Chemistry and Technology*, 5(1), 135-158 (1985).
Natural Tannin-Based Adhesives for Wood Composite Products of Low or No Formaldehyde Emission:, FAIR, http://www.blomatnet.org/secure/Fair/F340.htm, (Jan. 1999).
"Industrial Plasticizing/Dispersion Aids for Cement Based on Polyflavonoid Tannins", Kaspar and Pizzi, *Journal of Applied Polymer Science*, vol. 59, 1181-1190 (1996).

* cited by examiner

*Primary Examiner*—David M Brunsman
(74) *Attorney, Agent, or Firm*—David L. Hedden

(57) ABSTRACT

This invention relates to a binder composition comprising condensed tannin and furfuryl alcohol. The composition can be used to prepare foundry mixes. The foundry mixes are prepared by mixing the composition with an acid or salt of an acid. The foundry mixes are then shaped into molds or cores and cured by heating or by the no-bake process with stronger acid curing catalysts. The molds and cores are used in casting metal articles.

10 Claims, No Drawings

BINDER COMPOSITION COMPRISING CONDENSED TANNIN AND FURFURYL ALCOHOL AND ITS USES

CLAIM TO PRIORITY

This application claims the benefit of U.S. application Ser. No. 10/966,342 filed on Oct. 15, 2004, entitled "Binder Composition Comprising Condensed Tannin and Furfuryl Alcohol and Its Uses, the entire disclosure of which is hereby incorporated into this application, now U.S. Pat. No. 7,211,137, patented May 1, 2007.

TECHNICAL FIELD OF THE INVENTION

This invention relates to a binder composition comprising condensed tannin and furfuryl alcohol. The composition can be used to prepare foundry mixes. The foundry mixes are prepared by mixing the composition with an acid or salt of an acid, The foundry mixes are then shaped into molds or cores and cured by heating or by the no-bake process with stronger acid curing catalysts. The molds and cores are used in casting metal articles.

BACKGROUND OF THE INVENTION

It is known that molds and cores, which are used in the casting of metal articles, can be made from a foundry aggregate, e.g. sand, and heat curable or no-bake foundry binders, e.g. furan binders. One of the problems with using heat curable binders for making cores and molds is that the process is slow, i.e. low productivity, and energy requirements are high. Another problem with using such binders is that the binders typically contain free formaldehyde and/or free phenol, which are undesirable from a health and safety standpoint. Because of these problems, there have been attempts to improve the quality, productivity, performance, and environmental acceptability of processes that use heat curable binders for making molds and cores.

Two of the best-known processes for making molds and cores with heat curable binders are the hot-box process and the warm-box process. The hot-box process uses a binder composed of phenolic and/or urea/formaldehyde resins, sometimes modified with furfuryl alcohol. The binder is mixed with a foundry aggregate and cured with latent, acid salt catalysts, such as ammonium chloride. Although the process provides thermally stable cores with high immediate and final strength, the process has disadvantages because there are significant amounts of free formaldehyde and free phenol in the binder.

Although there are some similarities between the warm-box process and the hot-box process, the warm-box process uses much higher levels of furfuryl alcohol than the hot-box process, and uses stronger latent acid salts and/or acids as curing catalysts than used in the hot-box process. Additionally, lower tooling temperatures are sometimes possible if the warm-box process is used. The curing chemistry of this process relies more on the acid curing of furfuryl alcohol to achieve the required reactivity and strength. Phenolic and urea/formaldehyde resins are generally still incorporated into the binder composition at lower levels, so the presence of free formaldehyde and phenol can still be a health and safety issue. The thermal stability of these binder systems is generally considered to be lower than hot-box binders because of the reduced amount of phenolic and urea/formaldehyde resins that impart hot strength. In addition there is often a significant compromise between reactivity and immediate strengths versus the working life of the mixed sand. By increasing the strength of the acid curing catalyst, the process can be carried out without heat, i.e. by the no-bake furan process. But because heat is not used, it is usually necessary to use acid curing catalysts having a greater strength. Typically, these catalysts are sulfur-containing catalysts, e.g. sulfuric acid, sulfonic acid, etc. The problem with using these sulfur-containing catalysts is that high levels of sulfur dioxide are typically emitted when metals are cast from the cores and molds made by the no-bake process. This has the potential of creating environmental, health, and safety issues.

Hot-box and warm-box binders often contain a urea/formaldehyde resin. These binders contain nitrogen that can be emitted as a gas during the casting process. The nitrogen gas emitted can cause casting defects if present at high levels, or the metal cast is sufficiently sensitive to this type of defect.

It is clear that there are advantages and disadvantages to the hot-box and warm-box processes. But both processes have a major disadvantage in common, which is the use of binders that contain free formaldehyde and free phenol to some degree. A heat-curable binder that did not contain free formaldehyde or free phenol would offer obvious advantages. In addition, if the no-bake process were used, reduced catalyst quantities or significantly weaker and/or lower sulfur content catalysts could be used instead of the typical addition or strength of curing catalysts used, which would typically result in lower sulfur dioxide emissions during the casting process.

All citations referred to in this application are expressly incorporated by reference.

BRIEF SUMMARY OF THE INVENTION

This invention relates to a binder composition comprising condensed tannin, preferably tannin from the Quebracho tree, and furfuryl alcohol. A warm-box, hot-box, or no-bake curing catalyst can be added to the binder composition. The composition can be used to prepare foundry mixes by mixing the binder composition with a major amount of a foundry aggregate. The foundry mixes are then shaped into molds or cores by introducing them into a pattern, preferably a heated pattern when a warm-box or hot-box catalyst is used in the binder composition. But an unheated pattern may also be used in a no-bake process if a sufficiently strong acid catalyst is used as the curing catalyst. Preferably, the molds and cores are used in casting metal articles.

Because the furfuryl alcohol and the condensed tannin react when the condensed tannin is dissolved in furfuryl alcohol at temperatures >40° C., it is not necessary to use a catalyst and/or heat to cure the shaped foundry mix. If an increased cure rate is required, then a curing catalyst and/or increased heat is used.

Because it is not necessary to use binder components that contain free formaldehyde or free phenol, a foundry mix can be prepared that can be blown into heated tooling at a temperature and duration comparable to that of the conventional hot or warm box technology and form a cured sand core, without using components having free formaldehyde and free phenol.

Preferably, the binder contains 0% free phenol, 0% free formaldehyde, and 0% nitrogen.

Because the binder preferably does not contain free formaldehyde, it is not necessary to use urea in the binder, which acts as a formaldehyde scavenger but also increases the nitrogen content of the binder system. This results in a nitrogen-free binder that does not generate nitrogen gas, which can cause defects in susceptible metal castings.

In addition to the occupational health and safety advantage, relatively weak acid salts can be used as the curing catalyst, which results in a foundry mix that has good benchlife and produces cores and molds with good strength immediately upon ejection from the tooling and when the core is cold and final cure has been attained.

Experimental work also suggests that the hot strength of cores prepared by the process are higher than cured furfuryl alcohol alone and as such reduce the likelihood of core distortion under metal casting conditions. Essentially, this invention offers then advantages of both hot-box and warm-box technologies and few, if any, of the disadvantages.

The use of the binder composition in the cold cured or no-bake process allows one to use a much weaker strength catalyst, for instance those that do not contain sulfur, or lesser amounts of sulfur-containing catalysts. This usually results in reduced sulfur content of the catalyst, which will obviously result in lower sulfur dioxide exposure during the casting of metal parts. Additionally, the amount of free phenol, free formaldehyde, and nitrogen in the binder is reduced or eliminated.

DETAILED DESCRIPTION OF THE INVENTION

The detailed description and examples will illustrate specific embodiments of the invention and will enable one skilled in the art to practice the invention, including the best mode. It is contemplated that many equivalent embodiments of the invention will be operable besides these specifically disclosed.

Condensed tannins, also known as protoanthocyanidins, are polymeric flavanoids extracted from plants, e.g. roots, bark, shoots, or leaves of the plant. The condensed tannins used in the binder composition typically have an average molecular weight of from about 500 to about 50,000, preferably from about 1,000 to about 25,000, most preferably from about 1,000 to about 10,000. The condensed tannins typically have a viscosity of from about 0.1 poise to about 200 poises, preferably from about 1.0 poise to about 100 poises, most preferably from about 5 poises to about 100 poises.

The preferred condensed tannin, tannin from the Quebracho tree or sulfonated quebracho, is derived from the core of the tree of the genus *Schinopsis,* which is abundant in Argentina and Paraguay. It constitutes about 30% of the dry weight of the wood from the core and is easily extracted by means of hot water.

The binder is prepared by mixing the condensed tannin with furfuryl alcohol such that the amount of condensed tannin is typically from about 1.0 weight percent to about 40 weight percent, based upon the weight percent of the mixture of condensed tannin and furfuryl alcohol, preferably from about 15 weight percent to about 30 weight percent, most preferably from about 20 weight percent to about 25 weight percent.

In order to accelerate the cure speed of the binder, it is desirable to add a curing catalyst to the binder composition. In general, any inorganic or organic acid, preferably an organic acid, can be used as a curing catalyst. Typical curing catalysts used in the warm-box and hot-box process include latent acid salts such as copper chloride, copper toluene sulphonate, aluminum phenol sulphonate and acids such as phenol sulphonic acid, p-toluene sulphonic acid, lactic acid, benzene sulfonic acid, xylene sulfonic acid, sulfuric acid and mixtures thereof Particularly preferred curing catalysts used in the no-bake process are strong acids such as toluene sulfonic acid, xylene sulfonic acid, benzene sulfonic acid, HCl, and $H_2SO_4$. Weak acid such as phosphoric acid can also be used in the no-bake process.

The amount of curing catalyst used is an amount effective to result in foundry shapes that can be handled without breaking. Generally, this amount is from 1 to 60 weight percent based upon the weight of total binder, typically from 10 to 40, preferably 15 to 35 weight percent. The catalyst may be mixed with appropriate diluents, e.g. water, polyvinyl acetate, etc.

It will be apparent to those skilled in the art that other additives such as release agents, solvents, benchlife extenders, silicone compounds, etc. can be used and may be added to the binder composition, aggregate, or foundry mix. Although not necessarily preferred, the binder could also contain other components including, for example, resorcinol, phenolic resin, urea, urea formaldehyde resins, melamine/urea/formaldehyde resins, melamine formaldehyde resins, polyvinyl acetate/alcohol, and polyols (e.g. polyether polyols, polyester polyols).

The aggregate used to prepare the foundry mixes is that typically used in the foundry industry for such purposes or any aggregate that will work for such purposes. Generally, the aggregate is sand, which contains at least 70 percent by weight silica. Other suitable aggregate materials include zircon, alumina-silicate sand, chromite sand, and the like. Generally, the particle size of the aggregate is such that at least 80 percent by weight of the aggregate has an average particle size between 40 and 150 mesh (Tyler Screen Mesh).

The amount of binder used is an amount that is effective in producing a foundry shape that can be handled or is self-supporting after curing. In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5% by weight based upon the weight of the aggregate in ordinary sand-type foundry shapes.

Although it is possible to mix the components of the binder with the aggregate in various sequences, if a curing catalyst is used, it is preferred to add the curing acid catalyst to the aggregate and mix it with the aggregate before adding the other components of the binder.

Generally, curing is accomplished by filling the foundry mix into a pattern (e.g. a mold or a core box) to produce a workable foundry shape. In the hot-box and warm-box process preferably, the pattern is pre-heated to a temperature typically ranging from 150° C. and 300° C. A workable foundry shape is one that can be handled without breaking. Typically, the dwell time in the pattern is from 1 minute to 5 minutes. In the no-bake process the pattern can be cold and the dwell time is dependant on the strength of the catalyst, the stronger the catalyst the shorter the dwell time.

Metal castings can be prepared from the workable foundry shapes by methods well known in the art. Molten ferrous or non-ferrous metals are poured into or around the workable shape. The metal is allowed to cool and solidify, and then the casting is removed from the foundry shape.

Abbreviations and/or Definitions

| | |
|---|---|
| AS | an aminosilane; e.g., aminopropyldimethoxymethylsilane. |
| C-1 | a solution consisting of 46.2% urea, 10.5% ammonium chloride, and 46.3% water. |
| C-2 | a solution of 80 weight percent lactic acid in water. |
| C-3 | a 54% aqueous solution of aluminum phenol sulphonate (Eltesol 4427 from Albright & Wilson, Oldbury, West Midlands, U.K). |
| C-4 | an 80:20 blend of lactic acid and para-toluene sulfonic acid. |
| C-5 | a phenol sulfonate hot-box catalyst. |
| C-6 | a 65% aqueous solution of para-toluene sulfonic acid. |
| FA | Furfuryl alcohol. |
| FM | Formalin as a 50% solution in water. |
| QT | Quebracho tannin supplied by Indunur S.A., Buenos Aires, Republic Argentina. |
| PF | Proprietary phenolic resin used in conventional furan no-bake resins. |

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated.

Measurement of Hot (Immediate) and Cold (Two Hours) Tensile Strength in the Hot/Warm Box Process The test strengths of the heat-cured test cores made in the examples were measured by mixing known quantities of resin and catalyst on sand using a conventional kitchen mixer. The mixed sand is then blown into heated tooling which forms the shape of a tensile "dog-bone" standard strength test piece. The mixed sand is allowed to "dwell" in the tooling for a specified amount of time and then the test piece is removed from the tooling. A "hot" tensile strength measurement is conducted immediately and this is repeated to obtain an average. Further test pieces are made and allowed to cool for 2 hours and a tensile strength measurement is taken again. In some cases the mixed sand is allowed to stand at room temperature and the above mentioned tests repeated again in order to assess the "benchlife" properties of the mixed sand or how long the mixed sand remains viable.

Measurement of Cure Speed in the Furan No-bake Process

The measure of cure speed in the furan no-bake process is conducted by mixing resin and catalyst on the sand using a conventional kitchen mixer. The mixed sand is then rammed into a container of appropriate size to make a test biscuit. A mould strength probe tester is then inserted into the biscuit and a measurement of the degree of cure is read off the dial. A full deflection reading of the dial (30 psi) signifies full cure and the biscuit is removed from the container. Further measurements are taken on the under side of the biscuit where a further full deflection reading on the dial signifies a degree of cure sufficient to strip a mould.

Measurement of Transverse Strength in the Furan No-bake Process

At the same time as the cure speed test above, a portion of the same mixed sand is also hand rammed into a 12 gang standard 1×1×12 inch transverse test piece tooling. These test pieces are allowed to cure and are stripping from the tooling as dictated by the cure speed test. The test pieces are then allowed to further cure at room temperature and strength measurements are taken at 1 hr, 2 hr, 4 hr and 24 hrs.

Measurement of Hot Distortion

The test strengths of the test cores made in the examples were measured by the using the BCIRA hot distortion tester. The test is carried out by preparing a bonded sand test piece having approximate dimensions of 120 mm×22 mm×6 mm. The test piece is gripped at one end in the tester with the rest of the test piece suspended over a Bunsen flame, which exposes the center of the test piece to the temperature required, typically between 800° C. and 1000° C. A device for measuring vertical deflection is placed on the opposite end of the test piece and is connected to a chart recorder to record this deflection. The flame is ignited and the chart recorder started.

The silica sand within the test piece expands greater on the hotter side of the test piece than the colder side, which causes the test piece to bend upwards. The thermal resistance of the binder will then generate a specific graphic profile, which highlights the points where the binder may become thermoplastic. These points are where the test piece stops bending upwards or even bends in the opposite direction, ultimately breaking due to thermal degradation. A high upwards deflection suggests good thermal resistance and high hot strength, which have various advantages in cast metal applications, i.e. reduced mould dilation and core warpage.

Example 1-5

Binder Preparation

Binder compositions were prepared by mixing QT with FA. In some of the binders, an AS or FM were added to the binder composition. The formulation for the binder compositions is set forth in Table I. The viscosity of the binders of Examples 1-4 was approximately 50 to 300 cP at 20° C.

TABLE I

| (Binder compositions) | | | | | |
|---|---|---|---|---|---|
| Example | QT | FA | FM | AS | PF |
| 1 | 33 | 67 | | | |
| 2 | 24 | 76 | | | |
| 3 | 22.9 | 72.4 | 4.7 | | |
| 4 | 23.9 | 75.7 | | 0.4 | |
| 5[1] | 24 | 76 | | | |
| 6 | | 76 | | 0.2 | 23.8 |

[1]Same binder as in Example 2, except the binder was thermally advanced to a viscosity of 1000 cP.

Examples 6-10

Cores Made with Binder in a Heated Pattern without Catalyst

Cores were made by mixing 1.9 parts of the binder with 100 parts of Congleton HST50 sand from WBB Minerals to form a foundry mix using a suitable batch mixer until the mix is homogeneous. The resulting foundry mix was then blown into a metal pattern, pre-heated to a temperature of 250° C., to form a core using compressed air. The core was allowed to reside in the pattern for 60 seconds, unless otherwise specified, before it was removed. The binders used and the properties of the cores made are set forth in Table II.

TABLE II (Binder compositions)

| Example | Binder | Tensile Strength (kPa) | |
|---|---|---|---|
| | | Hot | Cold |
| 6 | 2 | 23.57 | 260 |
| 7 | 3 | 14.21 | 195.8 |
| 8 | 4 | 5.46 | 157.6 |

The data in Table I indicate that cores can be made with the binders, in the absence of a curing catalyst, if the foundry mix is blown into a heated pattern.

Example 9

Binder Containing a Silane Cured with Heat without a Catalyst

Example 6 was repeated, except 0.4 part of a silane replaced 0.4 parts of the FA (binder of Example 4). The silane was mixed with the binder before adding the binder to the sand.

Both the hot and cold tensile strengths decreased when the silane was added. Because the silane is basic in nature, this example indicates that the curing mechanism is driven more by acid strength and is therefore more similar to the warm-box process

Example 10

Binder Containing FM Cured with Heat without a Catalyst

Example 6 was repeated, except the binder comprised 22.9 parts of QT, 72.4 parts of FA, and 4.7 parts of FM (binder of Example 3).

Both the hot and cold tensile strengths decreased when FM was added. FM is normally required in the hot-box curing mechanism to impart reactivity. This confirms that the process is more comparable to the warm-box curing mechanism.

Examples 11-19

Cores Made with a Binder Cured Using a Curing Catalyst and a Heated Pattern

Examples 6-8 were repeated, except a catalyst was mixed with the sand before adding the binder to the sand. When carrying out the examples, it was observed that the foundry mix did not change color or consistency significantly after several hours. This is unlike typical warm-box systems that typically turn green, which indicates a loss of the working life of the foundry mix. No external crust formation, which is typically seen in foundry mixes used in the hot-box process, was observed. Instead, the working life of the foundry mix was typically between 2 and 4 hours, which provides a major advantage of reduced sand wastage and easier cleaning of equipment.

Additionally, there was no formaldehyde or phenol odor associated with the binder or foundry mix. The elimination of free formaldehyde and free phenol makes the used sand easier to reclaim and makes it easier to dispose of it without adding unwanted stress to the environment.

Unless otherwise specified, the weight ratio of binder to catalyst was 4.35:1.0 and the dwell time was 60 seconds. The binders used and the catalysts used are set forth in Table III, along with the properties of the core made are set forth in Table I.

TABLE III (Binder compositions)

| Example | Binder | Catalyst | Tensile Strength (kPa) | |
|---|---|---|---|---|
| | | | Hot | Cold |
| 11 | 1 | C-3 | 604.2 | 2262 |
| 12[2] | 2 | C-1 | 38.18 | 98.6 |
| 13 | 3 | C-1 | 27.4 | 227.7 |
| 14 | 2 | C-2 | 61.84 | 1426 |
| 15[3] | 2 | C-2 | 68.36 | 1217 |
| 16[4] | 2 | C-2 | 49.87 | 1071 |
| 17[5] | 2 | C-4 | 149.8 | 1071 |
| 18 | 4 | C-4 | 88.12 | 1943 |
| 19[6] | 5 | C-2 | 89.41 | 1502 |
| 20 | 4 | C-5 | 1004 | 2443 |
| 21 | 4 | C-3 | 828.4 | 2945 |

[2] The dwell time for this example was 120 seconds.
[3] The binder to catalyst ratio was 3.0.
[4] The binder to catalyst ratio was 2.0.
[5] The binder to catalyst ratio was 3.0.
[6] The binder to catalyst ratio was 3.0.

The hot distortion test results at extended residence times and high temperatures indicate that hot strength is superior to cores prepared with by a typical warm-box process.

Examples 22-23

Cores Made by No-bake Process Using a Curing Catalyst and no Heat

Cores were made by mixing 1.0 part of the binder with 100 parts of Congleton HST50 sand from WBB Minerals, onto which had previously been mixed an amount of C-6 catalyst as shown in table IV. A foundry mix was formed using a suitable batch mixer until the mix is homogeneous. The resulting foundry mix was then hand rammed into a metal pattern, at ambient temperature, to form a core. This action took place within the work time (WT) of the mixed sand to ensure maximum strength. The core was allowed to reside in the pattern for to 15-20 minutes, unless otherwise specified, or until sufficiently strong that it could be removed without breaking i.e. the strip time (ST). The binders used and the properties of the cores made are set forth in Table IV.

TABLE IV (Binder compositions)

| Example | Binder | Catalyst C-6 % (BOR) | Cure speed (minutes) | | Transversal Strength (kg/cm²) | |
|---|---|---|---|---|---|---|
| | | | WT | ST | 1 Hr | 24 Hr |
| 22 | 6 | 60 | 5 | 16 | 17.8 | 33.4 |
| 23 | 4 | 30 | 5 | 16 | 21.2 | 28.2 |

Approximately half the amount of catalyst C-6 was required to achieve the same cure speed and comparable strength development thereafter. The same reduction in sulfur added to the sand mixture would therefore also be achieved obviously resulting in a comparable reduction in the amount of sulfur dioxide emitted on casting.

We claim:

1. A process for making a foundry shape comprising:
   (a) preparing a foundry mix comprising a major amount of foundry aggregate and a binder comprising:
      (1) a condensed tannin; and
      (2) furfuryl alcohol;
   (b) introducing the foundry mix prepared by step (a) into a pattern to form a shape;
   (c) allowing the shape to cure until it can be handled without breaking; and
   (d) removing the shape from the pattern.

2. The process of claim 1 wherein the amount of binder is from 0.5 to 7 percent by weight based upon the weight of the aggregate.

3. The process of claim 2 wherein the pattern is heated to a temperature of from about 100° C. to about 350° C.

4. A foundry shape prepared by the process of claim 2.

5. The process of claim 1 wherein the binder comprises from about 1.0 weight percent to about 40 weight percent condensed tanin, based upon the weight percent of the mixture of condensed tannin and furfuryl alcohol.

6. The composition of claim 5, which further comprises a liquid curing catalyst.

7. The composition of claim 6 wherein the liquid curing catalysts is selected from the group consisting of copper chloride, copper toluene sulphonate, aluminum phenol sulphonate, phenol sulphonic acid, p-toluene sulphonic acid, lactic acid, benzene sulfonic acid, xylene sulfonic acid, sulfuric acid, salts thereof and mixtures thereof.

8. The composition of claim 7 wherein the amount of liquid curing catalyst is from about 1 to 60 weight percent based upon the weight of total binder.

9. The composition of claim 8 wherein the amount of condensed tannin is from about 10 weight percent to about 40 weight percent, based upon the weight percent of the mixture of condensed tannin and furfuryl alcohol.

10. The composition of claim 9 wherein the amount of liquid curing catalyst is from about 15 to 30 weight percent based upon the weight of total binder.

* * * * *